US009971702B1

(12) United States Patent
Xing

(10) Patent No.: US 9,971,702 B1
(45) Date of Patent: May 15, 2018

(54) NESTED EXCEPTION HANDLING

(71) Applicant: INTEL CORPORATION, Santa Clara, CA (US)

(72) Inventor: Bin Xing, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/332,841

(22) Filed: Oct. 24, 2016

(51) Int. Cl.
  *G06F 12/00* (2006.01)
  *G06F 12/1009* (2016.01)
  *G06F 12/128* (2016.01)

(52) U.S. Cl.
  CPC ........ *G06F 12/1009* (2013.01); *G06F 12/128* (2013.01); *G06F 2212/684* (2013.01); *G06F 2212/69* (2013.01)

(58) Field of Classification Search
  CPC ............... G06F 12/1009; G06F 12/128; G06F 2212/684; G06F 2212/69
  See application file for complete search history.

(56) References Cited

U.S. PATENT DOCUMENTS

| 9,244,855 B2* | 1/2016 | Grochowski | ....... G06F 12/1027 |
| 9,792,222 B2* | 10/2017 | Sahita | .................. G06F 12/1009 |
| 2014/0201495 A1* | 7/2014 | Hyuseinova | ........ G06F 12/1009 711/207 |

OTHER PUBLICATIONS

Intel, "Intel® 64 and IA-32 Architectures Software Developer's Manual," Sep. 2016, Chapters 37 and 38, 24 pages.
Intel, "Intel® Software Guard Extensions," Developer Guide, 2016, 34 pages.

* cited by examiner

*Primary Examiner* — Matthew Bradley
(74) *Attorney, Agent, or Firm* — Lowenstein Sandler LLP

(57) ABSTRACT

An example system that includes a processor and a memory device. The processor may include multiple execution units to execute instructions and a memory device coupled to the processor. The memory device stores the instructions in an unprotected region and a protected region. The processor may determine that a first exception occurred while executing a first set of instructions for an application stored in a secured page of the protected region. The processor may invoke a first subroutine to forward exception context for the first exception to a second subroutine, where the first subroutine is stored in the protected region and the second subroutine is stored in the unprotected region. The processor may invoke, by the second subroutine, a third subroutine to execute a second set of instructions associated with the exception context for the first exception.

20 Claims, 14 Drawing Sheets

NESTED EXCEPTION HANDLING

BACKGROUND

Computer systems, such as hardware systems and software systems that run on computers often have undetected flaws that may be exploited by hardware attacks or software attacks, such as malicious computer programs that are received over the Internet or other communication networks. The hardware attacks and software attacks may include Trojans, viruses, worms, spyware, and other malware. Processors in computer systems are designed to protect sensitive data in memory from both the hardware attacks and the software attacks. Many existing computer security systems combat hardware attacks and software attacks by attempting to prevent the attacks from compromising any part of the computer system.

BRIEF DESCRIPTION OF THE DRAWINGS

Various embodiments of the present invention will be understood more fully from the detailed description given below and from the accompanying drawings of various embodiments of the invention.

DESCRIPTION OF EMBODIMENTS

Figure 1:
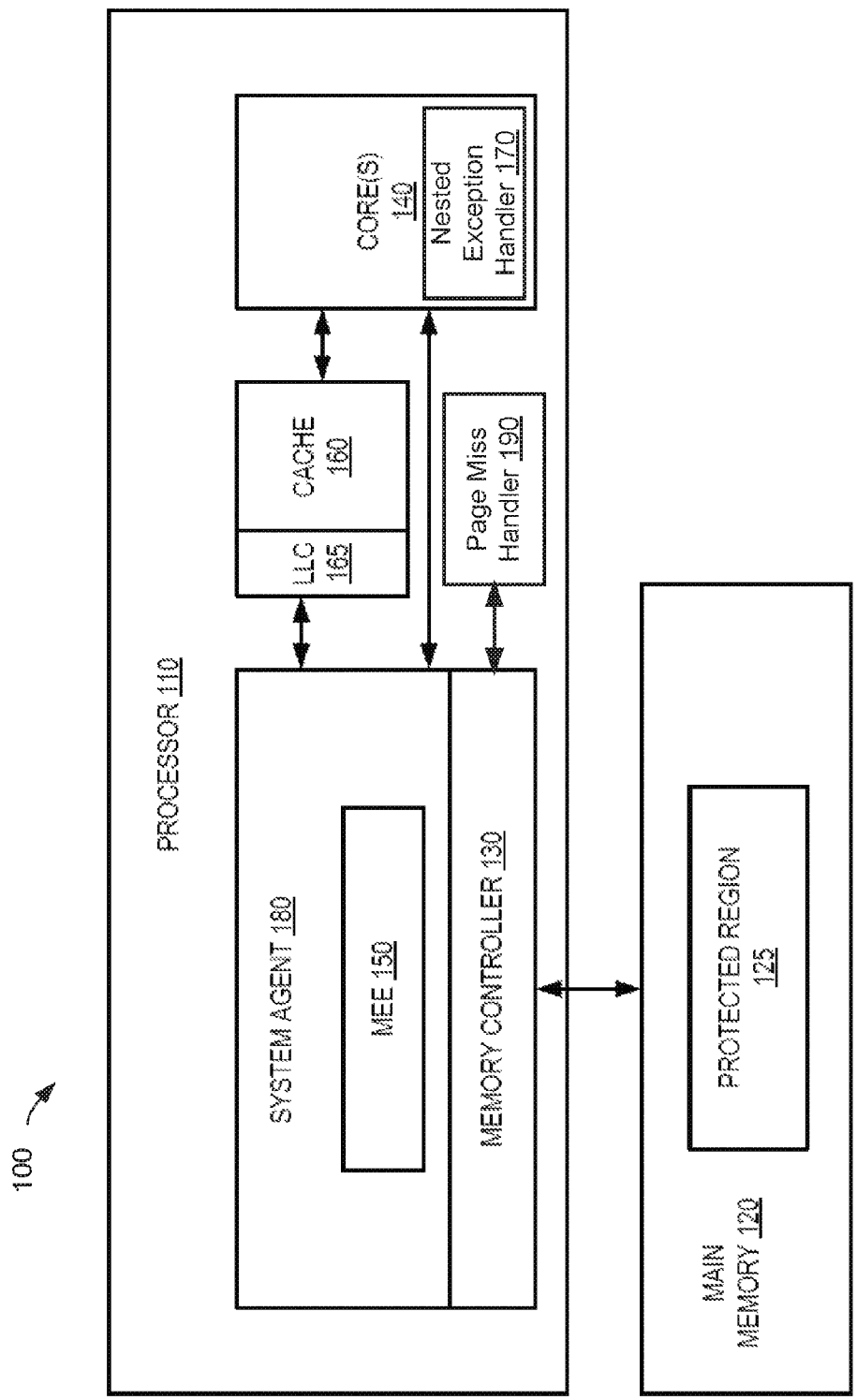
FIG. 1 is a block diagram illustrating a computing system that implements a memory encryption engine (MEE) for implementing secure memory according to one embodiment.

To prevent the hardware attacks or the software attacks from infiltrating selected applications, processors may provide protected regions for the selected applications to run. Access to the protected regions from any software that does not reside in the protected regions is prevented. The Intel® SGX technology is a security technology that allows applications to create protected regions of code and data, called enclaves. Enclaves are self-contained secure containers, meaning that any memory pages within an enclave are accessible only to the code belonging to (i.e. residing within) the same enclave. While computer security systems provide relatively low assurance protection of the entire software system, the protected regions provide relatively high security for the software in the protected regions.

The protected regions may not prevent hardware attacks or the software attacks from compromising parts outside the protected regions and within the system software. The protected regions may stop the hardware attacks or the software attacks, outside the enclave, from compromising parts within the protected regions.

The unprotected regions and the protected regions may be interruptible when an exception in a software program occurs. An exception in a software program may be an occurrence of anomalous or exceptional conditions requiring special processing that may change a regular flow of an execution of the software program. An exception handler is a specialized programming language construct or computer hardware mechanism that may handle the exception.

When an exception occurs while a processor is executing code stored in a protected region, the processor may be restricted from accessing any software modules outside the protected regions, such as an operating system (OS) kernel. In response to the exception, the processor may store a processor context in a designated area within the interrupted protected region, referred to herein as a state save area (SSA). The processor context may be data stored in the processor registers, including: data registers, address registers, general-purpose registers (GPRs), special-purpose registers (SPRs), and so forth.

The protected region may be a range of virtual address space within which pages are protected and secured. For example, the protection region may include a stack of secured frames or secured pages. A secured frame may be one secured page in size. The secured page may store instructions or data. In one implementation, a secured page may store instructions for execution by the processor. In another implementation, the secured page may store data used by the processor. The processor may store a starting address and size of a secured frame or a secured page in a thread control structure (TCS).

The secured exception pages may be secured pages in the protected region that are reserved for storing data. For example, the secured exception pages may store a processor context when an interrupt or exception occurs that interrupts a main flow in the protected region. Conventionally, one or more secured exception pages may be allocated for a thread control structure (TCS) when a processor when a processor initiates use of a protected region of memory (e.g., executing an EENTER instruction). The TCS may be an architectural structure set up by program to convey information to the processor or u-code regarding a trusted thread. For example, the TCS may include: an address of an entry point of an enclave thread; an address and size of an SSA stack, an address and size of a local storage for a thread, and so forth. The processor or the u-code may use the TCS to store thread specific states, such as the index of the SSA frame allocated to a current execution of a program.

When an exception occurs while executing the instructions stored in a secured page, the processor may invoke an exception handler. As the exception handler handles the exception, one or more subsequent exceptions may occur, referred to herein as nested exceptions or chained exceptions. When the nested exceptions occur, additional secured exception pages may need to be used to handle the additional exceptions. However, the protected region may include a limited number of secured exception pages. As a number of occurrences of the nested exceptions increases, the number of secured exception pages allocated for the protected region, when the EENTER instruction is executed, may be exceeded, i.e. a number of secured exception pages configured for a TCS. When the number of secured exception pages allocated for the TCS protected region may be exceeded, the exceptions may not be handled by the exception handlers and the software program may fail or operate incorrectly.

The embodiments described herein may address the above-noted deficiencies by providing a mechanism or device to move an exception context from a secured exception page into a secured page so that the exception handler may run without the use of multiple secured exception pages when a nested exception occurs. For example, the protected region may include secured pages and secured exception pages that may be used by the processor during a protected region main flow. When an exception occurs while a processor is executing the instructions stored in the secured pages, a secured exception page may be used by an exception handler in handling the exception. A value stored in an RIP register may be modified by an exception handler to point to an exception stub. The exception stub is a software routine for a requested procedure that is substituted for a current software program. The exception stub forwards exception context to a routine stored at the secured page that handles exceptions.

The exception context may include information describing the exception that occurred and a processor context when the exception occurred. When nested exceptions occur, multiple exception stubs may be generated to forward respective exception context to the routine handling the exceptions and store a reference to a preceding exception. As the routine completes the handling of the nested exceptions, an exception handler may forward the results of handling the current exception to previous exception stubs until the exceptions in the nested exception are handled. The nested exception may include a page fault exception, a divide by zero exception, a general protection (GP) fault, or other hardware exceptions.

The first exception stub of the multiple exception stubs may then send the overall results of handling the exception the software application. The mechanism or device using exception stubs at the secured exception page and executing the routine at the secured page may avoid exceeding the size limitations of the secured region. Additionally, the mechanism or device using exception stubs at the secured exception page and executing the routine at the secured page may reduce a number of EENTER and EEXIT instructions that are executed and cause the processor to exit and enter the secured region to execute instructions for a program, thereby increasing a security of the secured region and reducing a number of processor cycles to handle nested exceptions.

FIG. 1 is a block diagram illustrating a computing system 100 that implements a memory encryption engine (MEE) 150 for implementing secure memory according to one embodiment. The secure memory may be setup at boot time by a basic input-output system (BIOS). The processor 110 executes instructions to add secured pages and secured exception pages to a protected region of memory as guided by software executing on the processor 110, such as an operating system (OS) or a virtual machine monitor (VMM), as described herein. Also, the memory protections afforded by the MEE are transparent in the sense that the processor does not have to execute any instructions for providing confidentiality, integrity and replay protections. For example, when any cache line belonging to a secure page is evicted, the MEE automatically provides these protections to that cache line. The processor 110 may be used in a system that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processor 110 may be used in a system on a chip (SoC) system.

The computing system 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, the computing system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present invention are not limited to any specific combination of hardware circuitry and software.

One embodiment may be described in the context of a single processor desktop or server system, but alternative embodiments may be included in a multiprocessor system. Computer system 100 may be an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus that transmits data signals between the processor 110 and other components in the system 100, such as memory 120 storing instruction, data, or any combination thereof. The other components of the system 100 may include a graphics accelerator, a memory controller hub, an I/O controller hub, a wireless transceiver, a Flash BIOS, a network controller, an audio controller, a serial expansion port, an I/O controller, etc. These elements perform their conventional functions that are well known to those familiar with the art.

In one embodiment, the processor 110 includes a Level 1 (L1) internal cache memory 160. Depending on the architecture, the processor 110 may have a single internal cache or multiple levels of internal caches. Other embodiments include a combination of both internal and external caches depending on the particular implementation and needs. A register file is to store different types of data in various registers including integer registers, floating point registers, vector registers, banked registers, shadow registers, checkpoint registers, status registers, configuration registers, and instruction pointer register.

It should be noted that the execution unit may or may not have a floating point unit. The processor 110, in one embodiment, includes a microcode (ucode) ROM to store microcode, which when executed, is to perform algorithms for certain macroinstructions or handle complex scenarios. Here, microcode is potentially updatable to handle logic bugs/fixes for processor 110.

Alternate embodiments of an execution unit may also be used in microcontrollers, embedded processors, graphics devices, DSPs, and other types of logic circuits. System 100 includes a memory 120. Memory 120 includes a dynamic random access memory (DRAM) device, a static random access memory (SRAM) device, flash memory device, or other memory device. Memory 120 stores instructions and/or data represented by data signals that are to be executed by the processor 110. The processor 110 is coupled to the memory 120 via a processor bus. A system logic chip, such as a memory controller hub (MCH) may be coupled to the processor bus and memory 120. An MCH may provide a high bandwidth memory path to memory 120 for instruction and data storage and for storage of graphics commands, data, and textures. The MCH may be used to direct data signals between the processor 110, memory 120, and other components in the system 100 and to bridge the data signals between processor bus, memory 120, and system I/O, for example. The MCH may be coupled to memory 120 through a memory interface. In some embodiments, the system logic chip may provide a graphics port for coupling to a graphics controller through an Accelerated Graphics Port (AGP) interconnect. The system 100 may also include an I/O controller hub (ICH). The ICH may provide direct connections to some I/O devices via a local I/O bus. The local I/O bus is a high-speed I/O bus for connecting peripherals to the memory 120, chipset, and processor 110. Some examples are the audio controller, firmware hub (flash BIOS), wireless transceiver, data storage, legacy I/O controller containing user input and keyboard interfaces, a serial expansion port such as Universal Serial Bus (USB), and a network controller. The data storage device may include a hard disk drive, a floppy disk drive, a CD-ROM device, a flash memory device, or other mass storage device.

For another embodiment of a system, the instructions executed by the processor core 140 described above may be used with a system on a chip. One embodiment of a system on a chip includes a processor and a memory. The memory for one such system is a flash memory. The flash memory may be located on the same die as the processor and other system components. Additionally, other logic blocks such as a memory controller or graphics controller may also be located on a system on a chip.

The processor 110 includes one or more processor cores 140 to execute instructions of the system. The processor core 140 includes, but is not limited to, pre-fetch logic to fetch instructions, decode logic to decode the instructions, execution logic to execute instructions and the like. The processor core 140 may also execute a nested exception handler 170 that is stored in a system memory protected by the MEE 150, as discussed in the paragraphs below.

The processor 110 includes a cache 160 to cache instructions and/or data. The cache 160 includes, but is not limited to, level one, level two, and a last level cache (LLC) 165, or any other configuration of the cache memory within the processor 110. In another embodiment, the computing system 100 includes a component, such as a processor 110 to employ execution units including logic to perform algorithms for processing data, in accordance with the embodiment described herein.

The memory controller 130 performs functions that enable the processor 110 to access and communicate with a main memory 120 that includes a volatile memory and/or a non-volatile memory. In one embodiment, the memory controller 130 is coupled to a system agent 180 that includes a MEE 150. In one embodiment, the MEE 150 is located between the last level cache 165 and the memory controller 130 to perform encryption, decryption and authentication of the data lines moving in and out of a protected region 125 of the main memory 120. The MEE 150 is located on the processor die, while the memory 120 is located off the processor die. In another embodiment the processor 110 may include a page miss handler (PMH) 190 that may maintain access control information for the protected region. The PMH 190 may be coulded to the memory controller 130 or the system agent 180. The processor 110 may include: a arithmetic logic unit that manages arithmetic and logic functions and a control unit that manages processing instructions received from the cache 160, the LLC 165 or the main memory 120.

According to one embodiment of the invention, the MEE 150 processes multiple memory read requests in parallel to improve the access latency to the protected region 125. The MEE 150 performs counter mode encryption which requires the encryption seed to be unique for a data line both temporally and spatially. Spatial uniqueness may be achieved by using the address of the data line to be accessed, while temporal uniqueness may be achieved by using a counter that serves as the version of the data line. In one embodiment, the MEE 150 also protects the data lines in the protected region 125 of the main memory 120 using a counter tree structure in which only the root of the tree is stored on-die and forms the root of trust (i.e., a trust boundary). The versions of the data lines are part of this counter tree structure. Alternatively, other protection mechanisms may be used for replay-protection. For example, Message Authentication Codes (MACs) associated with the secure cache lines may be stored on-die, since a successful replay attack would need to replay both the data line and its associated MAC. However, this solution has prohibitively high on-die storage requirements.

In one embodiment, memory encryption may protect a confidentiality of memory-resident data on the main memory 120. Memory encryption is primarily designed to protect against passive attacks where an attacker tries to silently observe the data lines as the data lines move on and off the processor. Some processors include an encryption module that encrypts sensitive data before the data is stored into a protected region of the memory. On a memory read to the protected region, the data line is decrypted before being fed into the processor. The encryption and decryption algorithms may be chosen based on the security level required by the user.

In another embodiment, the main memory 120 may be divided into regions, including one or more protected regions 125, also referred to herein as a secure memory range or a MEE region. Each region has multiple sections, an enclave page cache (EPC) section, a hardware reserved section of replay-protection and integrity metadata, and another hardware reserved section which is internal to implementation. In one embodiment, the protected region (MEE region) may be a fixed range or multiple protected regions (MEE regions) may be a set of multiple fixed ranges. In another embodiment, the entire memory may be configured as flexible memory, divided into multiple MEE regions. At startup, the entire memory starts as non-secure and the system software converts at least a portion of the memory as guided by the demand for secure memory on the system. As described herein, the main memory 120 may include multiple secure MEE regions, and may also include non-secure memory ranges.

Embodiments are not limited to computer systems. Alternative embodiments of the present invention may be used in other devices such as handheld devices and embedded applications. Some examples of handheld devices include cellular phones, Internet Protocol devices, digital cameras, PDAs, and handheld PCs. Embedded applications may include a microcontroller, a digital signal processor (DSP), system on a chip, network computers (NetPC), set-top boxes, network hubs, wide area network (WAN) switches, or any other system that may perform one or more instructions in accordance with at least one embodiment.

Figure 2A:
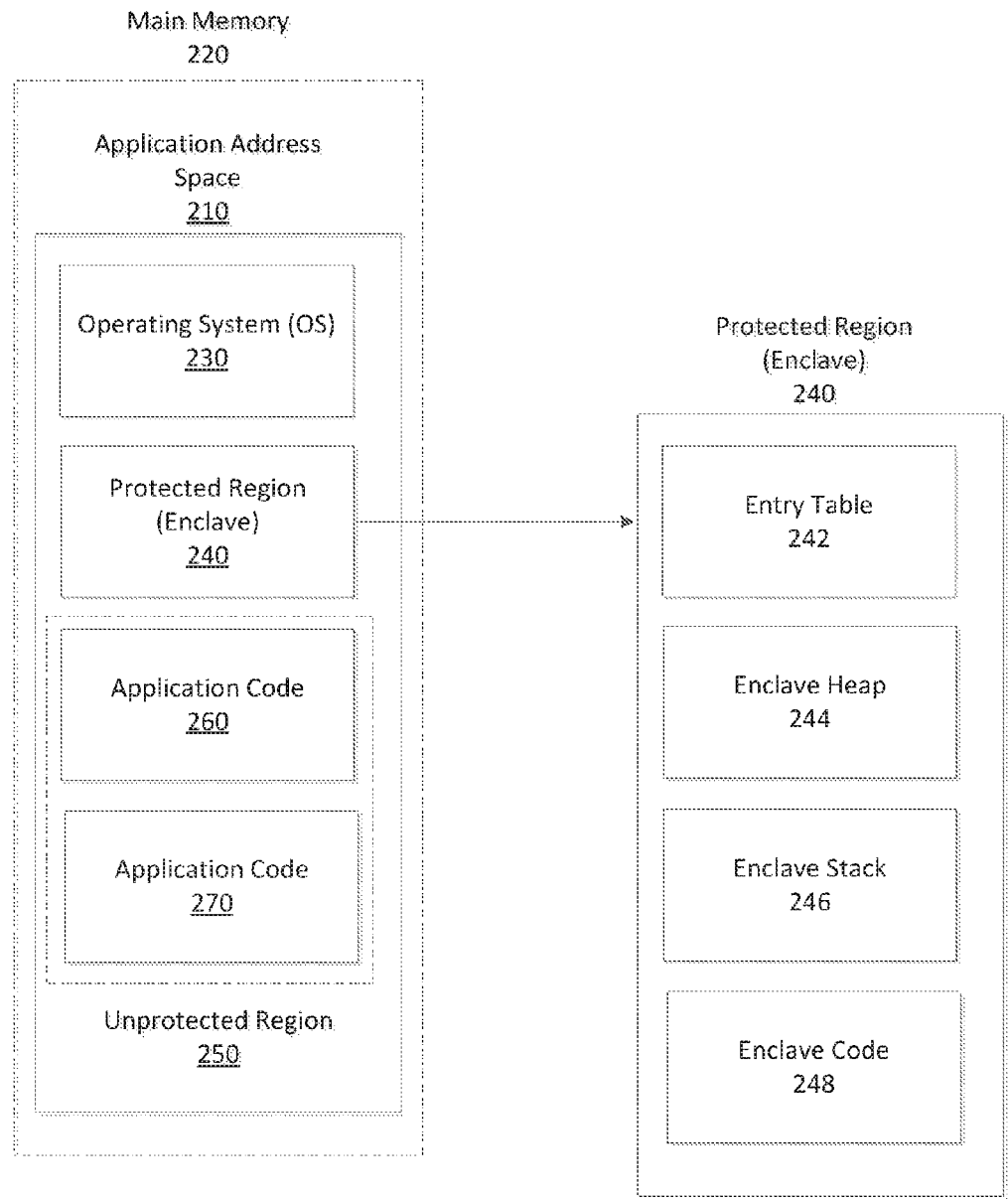
FIG. 2A illustrates a main memory, as shown in FIG. 1, that includes an application address space according to one embodiment.

FIG. 2A illustrates a main memory 220 (as shown in FIG. 1) that includes an application address space 210 according to one embodiment. FIG. 2A further illustrates that the application address space 210 may include memory allocated for operating system code 230, a protected region of memory 240 (also referred to herein as enclaves), and an unprotected region of memory 250. In one embodiment, the unprotected region of memory 250 may include application code 260 and 270. In another embodiment, the enclave 240 may include secure pages and the unprotected regions of memory 250 may include non-secure pages. In one example, the secure pages of the enclave 240 may include an entry table 242, an enclave heap 244, and enclave stack 246, and enclave code 248. The entry table 242 may be a table of references for a set of objects in the protected region 240. The enclave heap 244 may be a portion of memory where dynamically allocated memory may be located in the protected region 240. The enclave stack 246 may be a memory stack where local variables may be located in the protected region 240.

The enclave 240 is designed to protect third-party secrets from both hardware attacks and software attacks. An enclave may protect the confidentiality of enclave secrets by ensuring that the enclave secrets are stored encrypted when resident in platform memory. In order to provide complete protection from hardware attacks, an enclave provides integrity protection and replay protection. In the absence of integrity protection and replay protection, an attacker with physical access to the system may record snapshots of enclave cache lines and replay them at a later point in time. In order to achieve the enclave protections, an enclave may employ a MEE, which provides cryptographic mechanisms for encryption, integrity, and replay protection. The MEE is a hardware unit that implements the cryptographic functionality to secure pages when they are in memory. More specifically, the MEE may encrypt any cache line that gets evicted out of the processor if it belongs to a secure page and the MEE also provides integrity protection and replay-protection for the secure pages. Conventional strategies reserve a range of platform memory statically at boot time and enforce the cryptographic protections only on this range of memory. This secure memory range is referred to as the EPC. Enclave memory requests are satisfied from the EPC.

The EPC architecture may be dynamic or expandable to allow for dynamic reallocation of EPC memory. The expandable EPC architecture may make enclave implementations more efficient on servers requiring large amounts of EPC memory and on mobile platforms with limited memory systems. Software Guard Extensions (SGXs) of an interface architecture (IA) may enable dynamic management of the main memory in a protected execution area or protected region 240. SGX is a set of instructions and mechanisms for memory access for processors. In one embodiment, the SGX may enable an application to instantiate a protected region or enclave. In one example, memory pages may be reallocated to another linear address in the SGX architecture by freeing memory pages (including zeroing the contents of the memory pages) and then reallocating the freed memory pages to a new linear address. The SGX architecture protects sensitive data from unauthorized access or modification by rogue software running at higher privilege levels. The SGX architecture may enable applications to preserve the confidentiality and integrity of sensitive code and data without disrupting an ability of legitimate system software to schedule and manage the use of platform resources.

In one example, dynamic library loader algorithms may allocate memory pages at a private linear address during a memory page loading process and then relocate the memory pages to a target linear address. In one example, dynamic library loaders may run in the protected regions provided by SGX. The dynamic library loaders running in the protected execution area may increase performance gains in SGX applications and an efficient programming model. The dynamic library loaders running within SGX enclaves may enable a broader class of software to run within SGX and improve a performance of existing applications without heavy changes to the existing software models.

In one embodiment, the SGX may provide safeguards against viruses and malware by preventing access certain portions of memory. For example, sensitive or restricted data and/or code may be placed in the protected regions and the data and/or code is not visible outside of the enclave. One advantage of SGX is for virtual computing environments or virtual machines (VMs) where encryption is used within a guest operating system. In this example, database pages may be stored in SGX protected regions and/or operating system caches may be stored in SGX enclaves protected regions to protect the data and/or code from being accessed or copied.

Figure 2B:
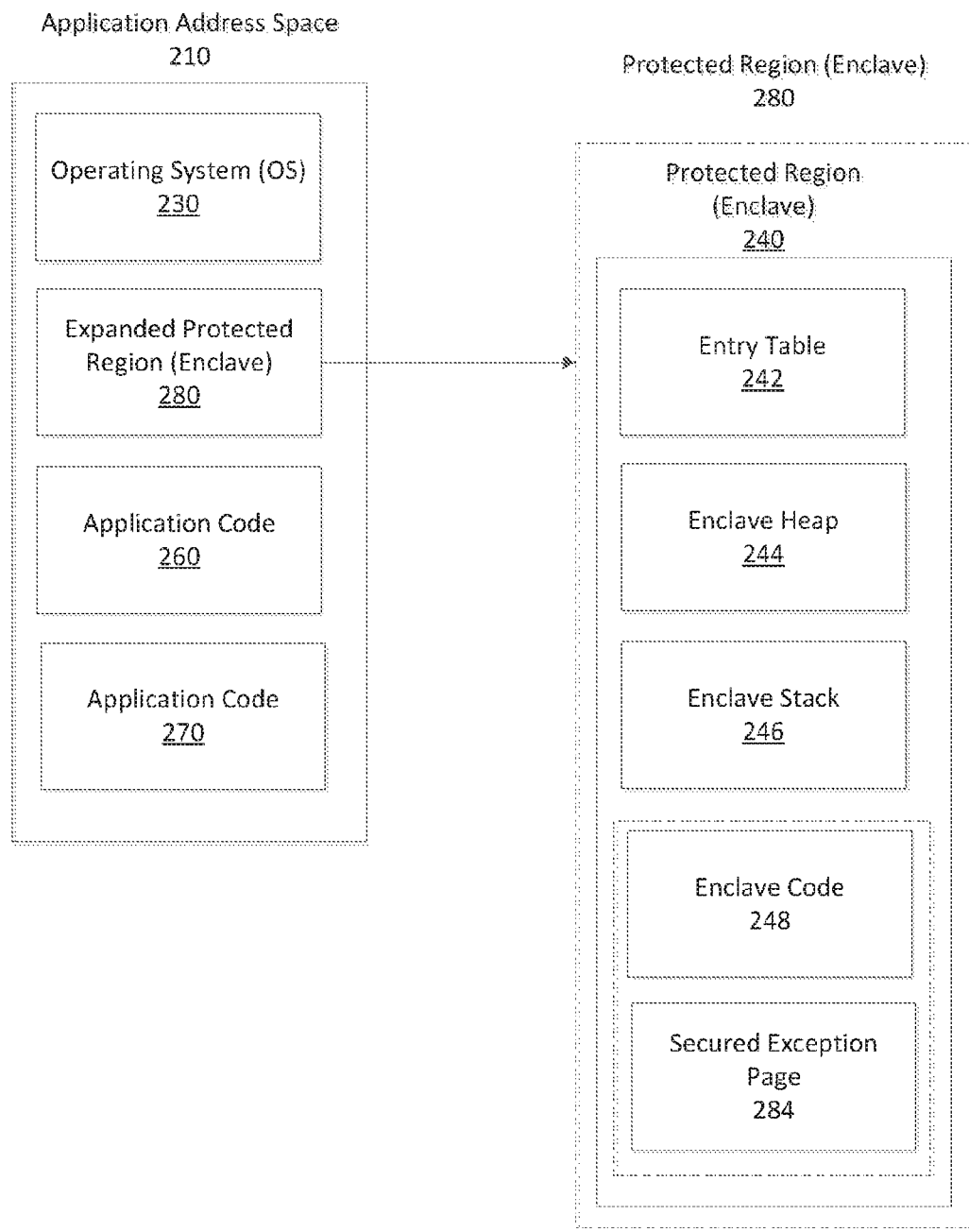
FIG. 2B illustrates that a protected region may include one or more source pages with selected content or code according to one embodiment.

FIG. 2B illustrates that a protected region 240 includes one or more secured source pages 282 and one or more secured exception pages 284 with selected content or code according to one embodiment. The one or more secured pages, such as the enclave code 248 may store instructions that are part of a software application that are executed in the expanded protected region 280. The one or more secured exception pages 284 may be added to the protected region 280 to store a processor context when exceptions that occur while executing the instructions stored in the one or more secured pages. Some of the features in FIG. 2B are the same or similar to the some of the features in FIG. 2A as noted by same reference numbers, unless expressly described otherwise.

Figure 3:
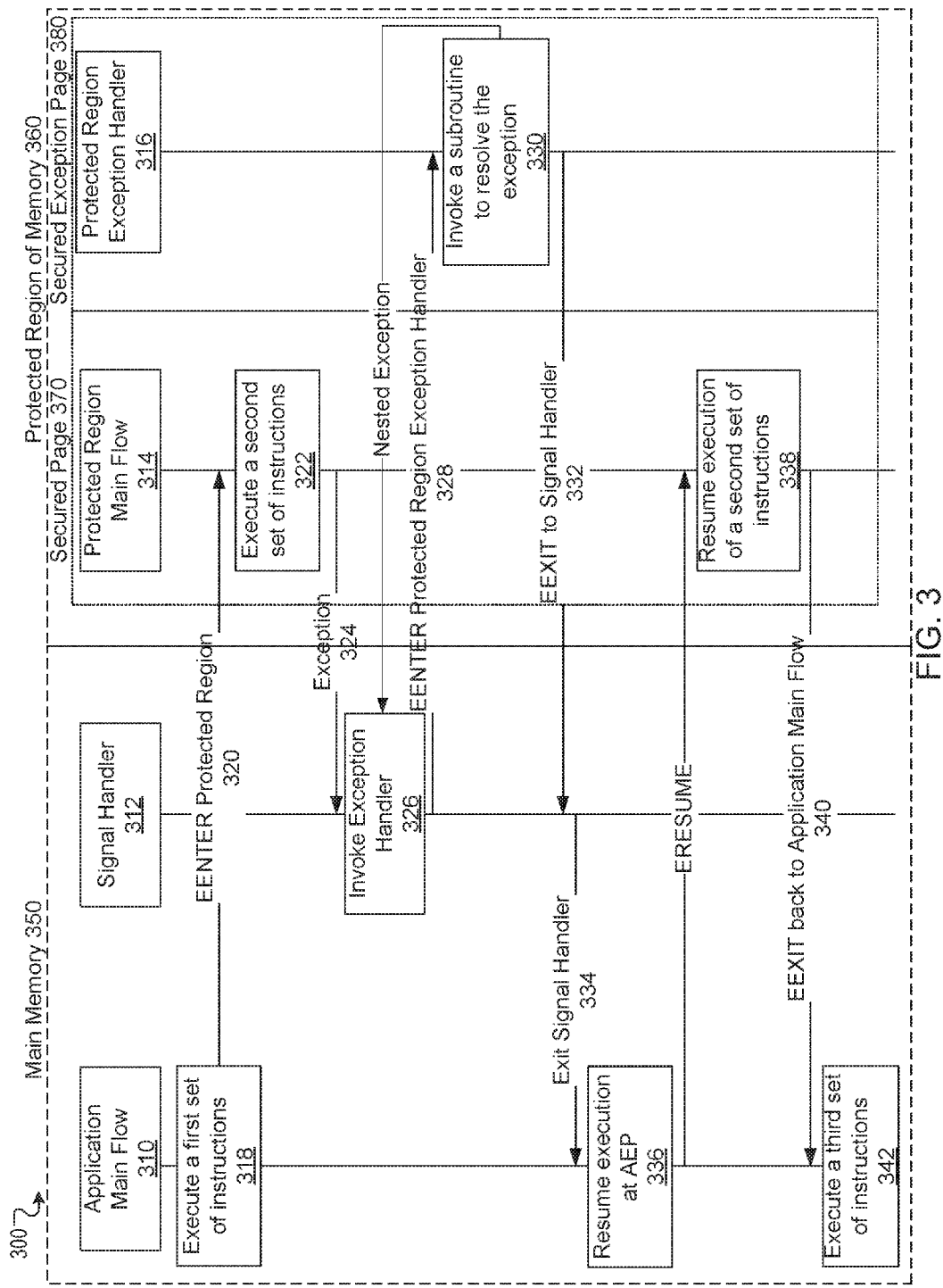
FIG. 3 illustrates a method resolving nested exceptions while executing instructions sets of an application main flow and a protected region main flow according to one embodiment.

FIG. 3 illustrates a method 300 resolving nested exceptions while executing instructions sets in an application main flow 310 and a protected region main flow 314 according to one embodiment. The method 300 may at least partially be performed by processing logic that includes hardware (e.g., circuitry, dedicated logic, programmable logic, microcode, etc.), software (e.g., instructions executed by a processing device), firmware or a combination thereof. In one embodiment, the method 300 may be performed by all or part of the computing system 100 of FIG. 1. For example, the method 300 may be performed by one or more of the processors 110.

Referring to FIG. 3, the method 300 begins with a processor executing an application main flow 310. The application main flow 310 may represent an application with instructions stored in a main memory 350 of a computing system and is executed by the processor. The protected region main flow 314 may represent an application with instructions stored in a protected region of memory 360 of a computing system and is executed by the processor. The signal handler 312 may be a subroutine, invoked by the application main flow 310, with instructions stored in a main memory 350 of a computing system and is executed by the processor. The protected region exception handler 316 may a subroutine, invoked by the protected region main flow 314, with instructions stored in the protected region of memory 360 of a computing system and is executed by the processor.

The method may include the application main flow 310 executing a first set of instructions (block 318). The first set of instructions may be a part of an instruction set for an application. The method may include the application main flow 310 invoking an EENTER instruction to enter a protected region of memory 360 in the computing system (arrow 320). The protected region may include a secured page 370 that stores instructions, which are executed by the processor, for the protected region main flow 314.

The EENTER instruction may be an instruction to enter the enclave and start an execution of a second set of instructions stored in the secured page 370. For example, the EENTER instruction is an instruction that switches a processor from a standard operating mode to a protected region mode. To switch the processor to the protected region mode, the EENTER instruction may modify registers at the processor to indicate whether an entry point is at the protected region of memory 360, an entry point at the secured page 370, or at the secured exception page 380. In one example, the RAX may be a register set by EENTER instruction, where the RAX indexes the secured exception page 370 and the secured exception page 380 that are allocated to the current execution. For example, secured exception page 370 and the secured exception page 380 may be organized as a stack and the RAX may be a stack pointer. When the processor executes an EENTER instruction, the processor may allocate a page or frame from the stack. When the processor executes an EEXIT instruction, the processor may exit protect region of memory 360 and free the secured exception page allocated by EENTER. RAX store the SSA index. The entry point specified in TCS is fixed and its code will determine whether the current flow is the main flow (RAX=0) or an exception flow (RAX>0).

In another example, the main flow 310 and the exception handler may share a same entry point. The RAX register may include a value for an entry point. The entry point may be a memory location for a beginning section of a set of instructions. The entry point may be set to pass control to the main flow 310 or the exception handler according to the value in the RAX register.

The method may include the protected region main flow 314 executing the second set of instructions that may be a part of an instruction set for an application (block 322). The method may include the protected region main flow 314 determining that a first exception occurring during the execution of the second set of instructions and may cause an asynchronous exit from the protected region of memory 360 and a signal injected into the application. A signal may report exceptional behavior within an application. The exceptional behavior may include an instruction to divide by zero, accessing a non-existing page, writing to a read-only page, executing an undefined or privileged instruction, violating alignment requirements in a data access, a breakpoint triggered by debug register, and so forth. In response to the exceptional behavior, the method may include sending an exception context to a signal handler 312 at the main memory 350 (arrow 324). The exception context may be information indicating a location (such as an instruction in an instruction set) where an exception occurs, register values in one or more processor registers when the exception occurred, and an indication of the type of exception that occurred.

The signal handler 312 may be a subroutine, invoked by an operating system kernel, that invokes and reports exceptional context to a protected region exception handler 316 (block 326). The exceptional context may include information indicate a type of exception that occurred, states of processor registers when the first exception occurred, or a location of an instruction that triggered the first exception. The exception handler may save a processor context to a stack in a memory device.

The following pseudo-code illustrates an example of a subroutine for an exception handler.
void exception_handler(exception_info_t*ex_info) {
context_t*ctxp=save_processor_context_on_stack( );
exception_specific_handler(ex_info, ctxp);
restore_processor_context(ctxp);
return;

The ex_info argument may be an argument with an exception context that is forwarded by the exception stub. The save_processor_context_on_stack( ) function call is an instruction to save the processor registers onto a stack. In one example, the save_processor_context_on_stack( ) function call may save volatile registers to the stack to speed up the exception handler.

In one embodiment, a cause of the first exception may be identified using the ex_info and ctxp arguments. The cause of the first exception may be used to identify an exception handler to resolve the first exception. In one example, the ex_info and ctxp arguments may include an indicator of a type of the exception that occurred, such as divided by zero exception. For example, the ex_info and ctxp arguments may be indicators to direct a processor to invoke exceptions of the same type to be handled by different handling subroutines. For example, page faults may be handled in different ways based on an address of the page being accessed. For example, a missing page within the heap virtual range may cause the heap to be expanded, while a write attempt to the code segment may abort an application.

An address of the instruction triggering the exception may be part of the processor context saved to secured exception page 380 by the processor. In another example, for an exception involving a memory address being accessed by the faulting instruction, e.g. writing to a read-only page, an address of the page being accessed by the faulting instruction may be reported to and passed by the signal handler 312 to the protected region exception handler 316 within the protected region of memory 360. In another embodiment, the processor may iterate through all registered handlers for a match. To provide that exceptions of the same type may be handled by different handling subroutines. For example, page faults may be handled in different ways depending on the address of the page being accessed.

To invoke the protected region exception handler 316, the signal handler 312 may execute an EENTER instruction to change a value in the RAX for an entry point (arrow 328). The entry point (also referred to as trampoline code) may direct the invoking of the protected region exception handler 316.

The method may include the protected region exception handler 316 invoking a subroutine to resolve the first exception (block 330). After resolving the first exception, the processor context may be restored from the stack back to the processor registers.

The subroutine that is invoked may be in view of the type of exception that occurs and is identified in the exception context. In one embodiment, a nested exception may occur while the protected region exception handler 316 is resolving the first exception. The nested exception may be one or more exceptions that occur while the protected region exception handler 316 is resolving the first exception. When a nested exception occurs while the protected region exception handler 316 is resolving the first exception, steps 326-330 may be iteratively performed for each instance of an exception that occurs in the nested exception. For example, when the exception handler 316 determines that a second exception has occurred when the exception handler 316 is executing instructions associated with the exception context for the first exception, the exception handler 316 may pause executing the instructions associated with exception context for the first exception. The exception handler 316 may then execute another set of instructions associated with exception context for the second exception. When the second exception has been resolved, the exception handler 316 may resume executing the instructions associated with exception context for the first exception.

When the protected region exception handler 316 has resolved the first exception and any nested exceptions, the protected region exception handler 316 may execute an EEXIT instruction to exit the secured exception page 380 and send exception resolution information to the signal handler 312 (arrow 332).

The signal handler 312 may execute an exit instruction to forward the exception resolution information to the application main flow 310 (334). The method may include the application main flow 310 executing an ERESUME instruction to resume executing the second set of instructions at an asynchronous exit point (AEP) (block 336).

The method may include, in response to the ERESUME instruction, the protected region main flow 314 resuming execution of the second set of instructions (block 338). When the protected region main flow 314 completes the execution of the second set of instructions, the protected region main flow 314 may execute an EEXIT instruction to exit the secured page 370 and return to the application main flow 310 (arrow 340). The method may include the application main flow 310 executing a third set of instructions (block 342).

Figure 4:
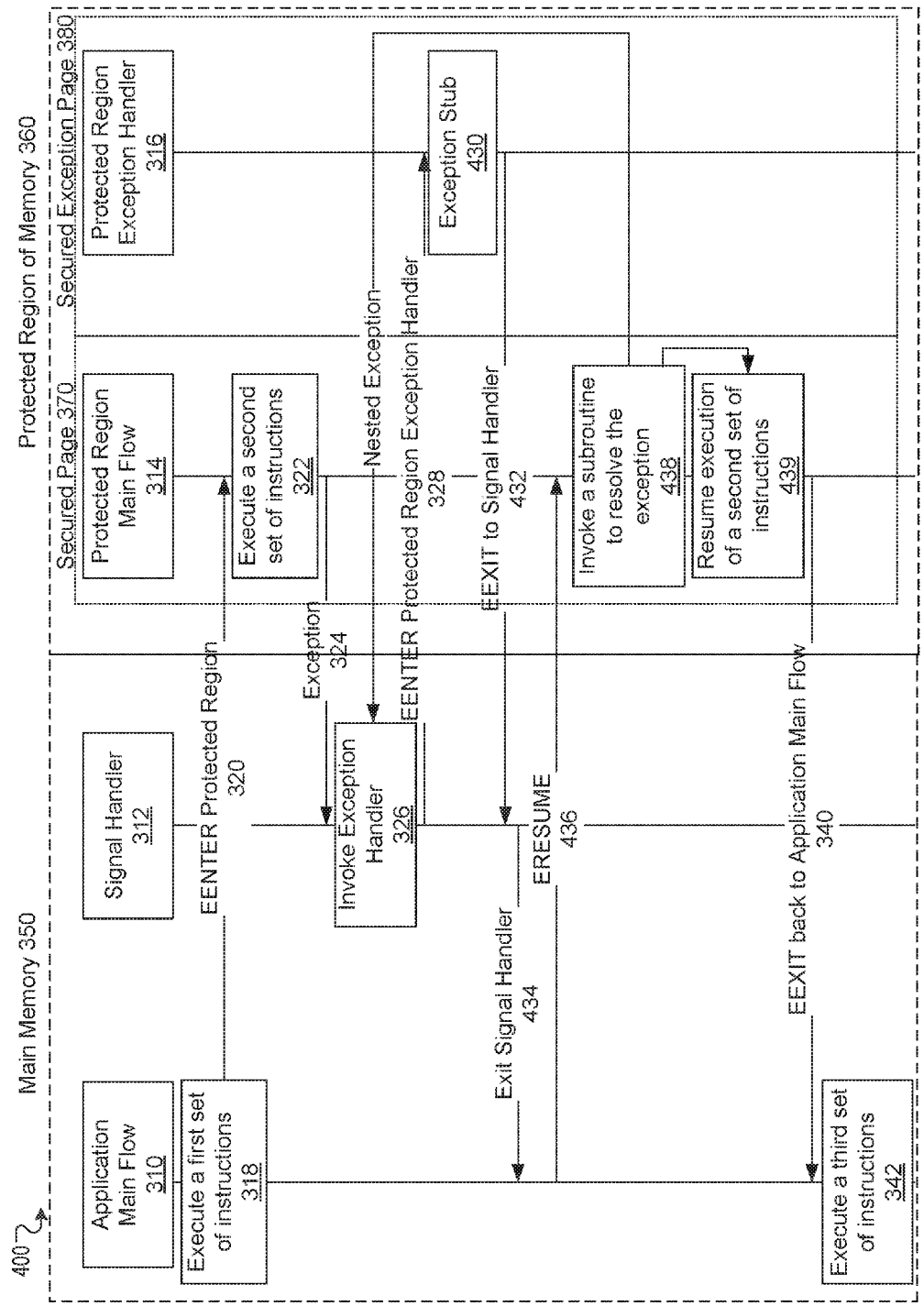
FIG. 4 illustrates a method resolving nested exceptions while executing instructions sets of an application main flow and a protected region main flow according to one embodiment.

FIG. 4 illustrates a method 400 resolving nested exceptions while executing instructions sets of an application main flow 310 and a protected region main flow 314 according to one embodiment. The method 400 may at least partially be performed by processing logic that includes hardware (e.g., circuitry, dedicated logic, programmable logic, microcode, etc.), software (e.g., instructions executed by a processing device), firmware or a combination thereof. In one embodiment, the method 400 may be performed by all or part of the computing system 100 of FIG. 1. For example, the method 400 may be performed by one or more of the processor 110. Some of the features in FIG. 4 are the same or similar to the some of the features in FIG. 3 as noted by same reference numbers, unless expressly described otherwise.

Referring to FIG. 4, the method may include the protected region exception handler 316 generating an exception stub (430). The exception stub is a subroutine that forwards exception context to the signal handler 312. To generate the exception stub, a RIP value stored in the secured exception page 380 may be set to a memory address of the exception stub. For example, the RIP value in the normal frame may be modified to point to the exception stub so the execution may resume at the exception stub instead of where the normal flow was interrupted. The RIP value may be stored at secured exception page 380.

The method may include the protected region exception handler 316 invoking an EEXIT instruction to exit the secured exception page 380 to the signal handler 312 (arrow 432). The method may include the signal handler 312 invoking an exit instruction to exit the signal handler to the application main flow 310 (434).

The following pseudo-code illustrates an example of the exception stub:
   void exception_stub(ssa_frame_t*normal_framep) {
   normal_framep→RSP-=2*sizeof(size_t);
   check_and_expand_stack( );
   size_t*stackp=(size_t*)normal_framep→RSP;
   stackp[0]=normal_framep→RIP;
   stackp[1]=normal_framep→exception_info;
   normal_framep→RIP=(size_t) exception_handler;
   EEXIT( );
   return;

The normal_framep argument may be calculated from a TCS address in practice. The normal_framep→RSP-=2*sizeof(size_t) may reserve stack space for the size_t*stackp and the stackp[0] function calls. The check_and_expand_stack( ) function call may check for stack overflow conditions and may expand the stack when the stack is overflowing. In one embodiment, the function calls preceding the check_and_expand_stack( ) may not write to stack space because an exception may trigger a stack overflow and render the enclave unusable. In another embodiment, the check_and_expand_stack( ) function call may invoke an EEXIT instruction without returning back to the exception_stub( ) function call after detecting a stack overflow. The check_and_expand_stack( ) function call may expand the stack in response to the stack overflow. In another embodiment, a combination of the exception_stub (ssa_frame_t*normal_framep), the size_t*stackp function call, and the stackp[0] function call may be equivalent to a push function call of the exception_info and an exception RIP onto the stack in an Intel® software guard extension (SGX) instruction set.

A value of the RIP indicating the location pointed to by the instruction pointer register at the time of an exception may be stored in a current SSA. In one example, the value of RIP may be read from a previous main flow's secured exception page 380 and is pushed onto a stack. The RIP in the secured exception page 380 may be substituted with an address of the protected region exception handler 438 and causes ERESUME 436 to resume the enclave at the protected region exception handler 438.

In response to pushing the exception RIP, the normal_framep→RIP statement preceding the EEXIT instruction sets the RIP to the address of exception_handler( ). EEXIT function call causes the exception (SSA) frame to be freed and resuming execution of the second instruction set at the protected region exception handler 438.

The method may include the application main flow 310 invoking an ERESUME instruction to enter the protected region main flow 314 (436). The ERESUME instruction may include loading the exception context from the secured exception page to the processor registers of the processor. The method may include the protected region main flow 314 invoking a subroutine to resolve the first exception (438).

The subroutine may be an exception handler with instructions stored at the secured page 370 to resolve the exception. In one embodiment, the subroutine may save the exception context and restore the processor registers back to a state when the exception occurred. In another embodiment, the subroutine may modify the exception context to resume the execution of the second set of instructions at a different location in the set of instructions where the exception occurred. In one embodiment, returning to the execution of the second set of instructions may cause the exception RIP to be popped back out into RIP. In another embodiment, to resume the execution of the second set of instructions, the protected region main flow 314 may use a return address that is stored in a ctxp parameter. The subroutine may change the address that the protected region main flow 316 returns to when resuming the execution of the second set of instructions.

In one embodiment, a nested exception may occur while the protected region exception handler 316 is resolving the first exception. When a nested exception occurs while the protected region exception handler 316 is resolving the first exception, steps 326-438 may be iteratively performed for each instance of an exception that occurs in the nested exception. For example, when the exception handler 316 determines that a second exception has occurred when the exception handler 316 is executing the instructions associated with the exception context for the first exception, the exception handler 316 may pause executing the instructions associated with exception context for the first exception. The exception handler 316 may then execute another set of instructions associated with exception context for the second exception. The protected region exception handler 316 generating a second exception stub. When the second exception has been resolved, the exception handler 316 may resume executing instructions associated with exception context for the first exception.

Figure 5A:
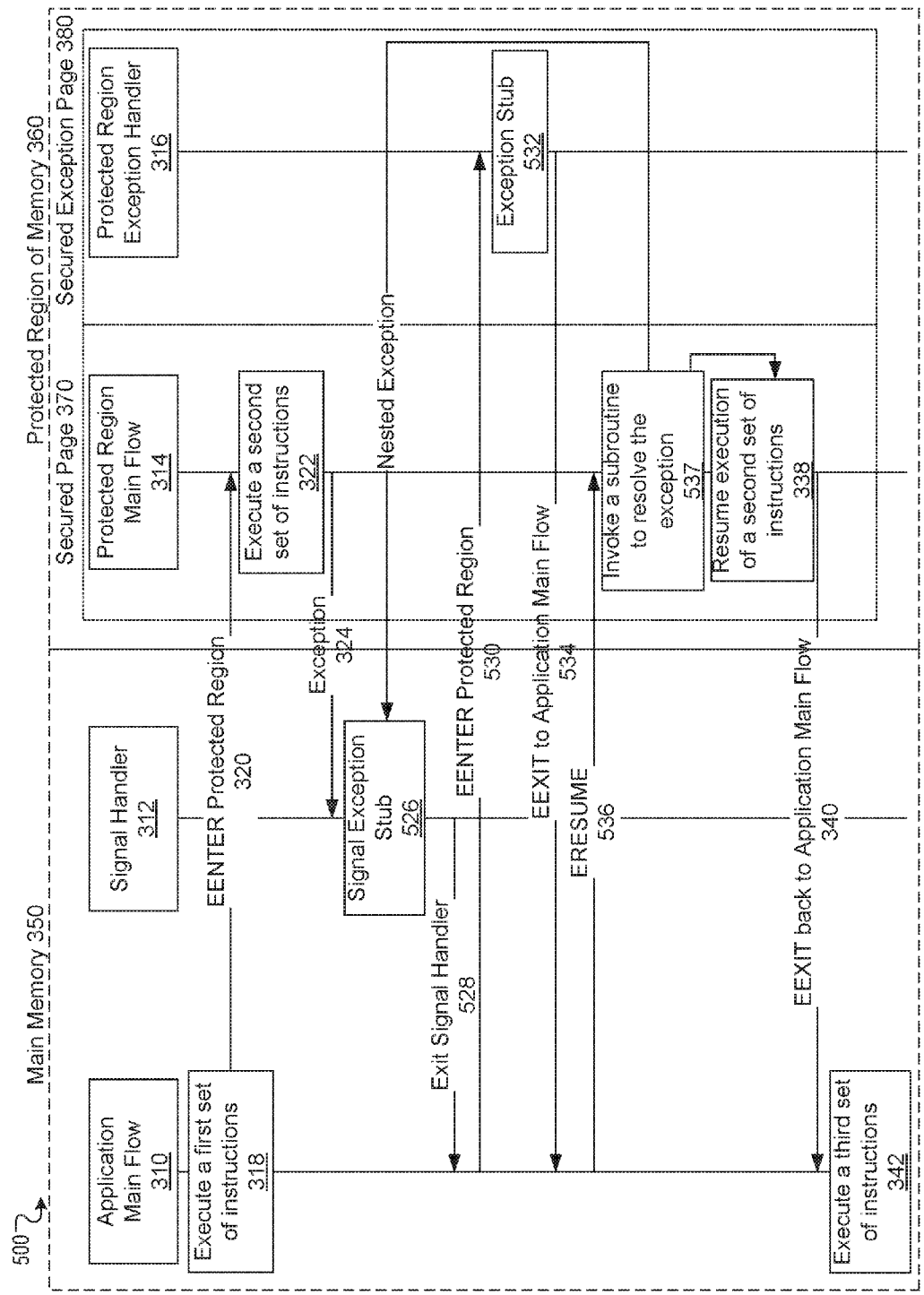
FIG. 5A illustrates a method resolving nested exceptions while executing instructions sets of an application main flow and a protected region main flow according to one embodiment.

FIG. 5A illustrates a method 500 resolving nested exceptions while executing instructions sets of an application main flow 310 and a protected region main flow 314 according to one embodiment. The method 500 may at least partially be performed by processing logic that includes hardware (e.g., circuitry, dedicated logic, programmable logic, microcode, etc.), software (e.g., instructions executed by a processing device), firmware or a combination thereof. In one embodiment, the method 500 may be performed by all or part of the computing system 100 of FIG. 1. For example, the method 500 may be performed by one or more of the processor 110. Some of the features in FIG. 5A are the same or similar to the some of the features in FIG. 3 as noted by same reference numbers, unless expressly described otherwise.

Referring to FIG. 5A, steps 318-324 are the same as steps 318-324 in FIG. 3. The method may include the signal handler 312 generating a signal exception stub (526). The signal handler 312 may change an ERESUME instruction to an EENTER instruction. For example, the signal handler 312 executes an instruction for the processor to exit back to the application main flow 310 before entering the secured page 370 to execute the subroutine to resolve the exception. In one embodiment, the signal handler 312 may change the ERESUME instruction to the EENTER instruction by changing a value stored in the RAX register. For example, a value of three in the RAX is associated with the ERESUME instruction and a value of two in the RAX is associated with the EENTER instruction and the signal handler 312 may switch the value in the RAX register from three to two.

The signal exception stub is a subroutine that forwards exception context to the application main flow 310. The method may include the signal handler 312 invoking an exit instruction to exit the signal handler to the application main flow (arrow 528). The method may include the application main flow 310 invoking an EENTER instruction to enter the protected region exception handler 316 at the secured exception page 380 (arrow 530). The method may include the protected region exception handler 316 generating an exception stub to forward an exception context to the application main flow 310 (block 532). The method may include the protected region exception handler 316 executing an EEXIT instruction to exit the protected region exception handler 316 to the application main flow 310 (arrow 534). The method may include the application main flow 310 executing an ERESUME instruction to enter the protected region main flow 314 (arrow 536). The method may include the protected region main flow 314 invoking a subroutine to resolve the exception (block 538).

In one embodiment, a nested exception may occur while the protected region exception handler 316 is resolving the first exception. When the nested exception occurs while the protected region exception handler 316 is resolving the first exception, steps 326-438 may be iteratively performed for each instance of the one or more exceptions that occurs in the nested exception. The method may include performing steps 338-342, which are the same as steps 338-342 in FIG. 3.

Figure 5B:
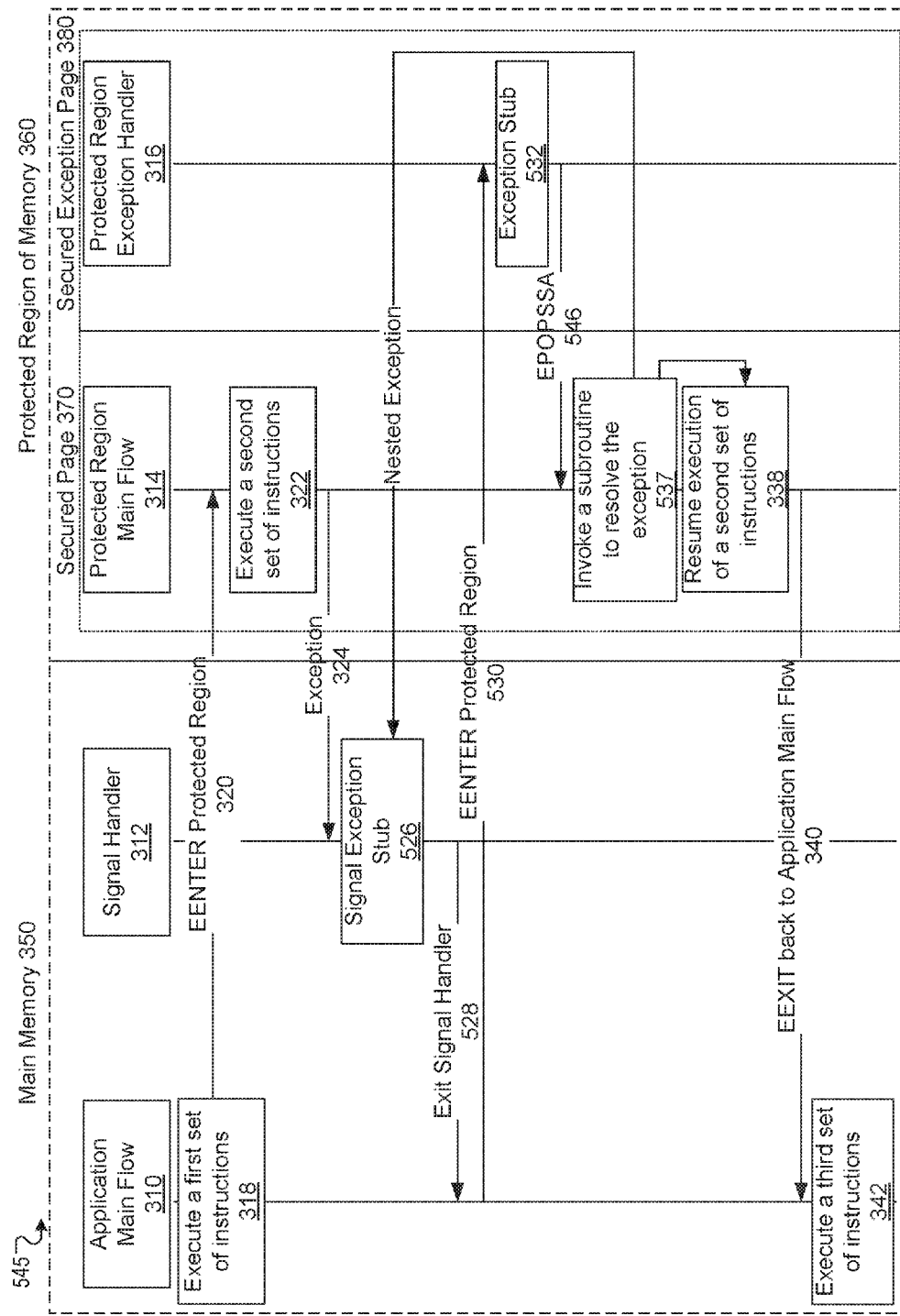
FIG. 5B illustrates a method resolving nested exceptions while executing instructions sets of an application main flow and a protected region main flow according to one embodiment.

FIG. 5B illustrates a method 545 resolving nested exceptions while executing instructions sets of an application main flow 310 and a protected region main flow 314 according to one embodiment. The method 545 may at least partially be performed by processing logic that includes hardware (e.g., circuitry, dedicated logic, programmable logic, microcode, etc.), software (e.g., instructions executed by a processing device), firmware or a combination thereof. In one embodiment, the method 545 may be performed by all or part of the computing system 100 of FIG. 1. For example, the method 545 may be performed by one or more of the processor 110. Some of the features in FIG. 5B are the same or similar to the some of the features in FIGS. 3 and 5A as noted by same reference numbers, unless expressly described otherwise.

Steps 318-324 in FIG. 5B are the same as steps 318-324 in FIG. 3. Additionally, steps 526-530 in FIG. 5B are the same as steps 526-530 in FIG. 5A. Following step 532, the method may include the protected region exception handler 316 executing an enclave-pop-state save area (EPOPSSA) instruction to send the exception context to the protected region main flow (arrow 546). The EPOPSSA instruction may be a combination of an EEXIT instruction and an ERESUME instruction to enable the processor to exit from the protected region exception handler 316 directly to the protected region main flow 314. The EPOPSSA instruction may avoid exiting and entering the protected region of memory 360 to handle an exception and increase a performance of the processor to handle exceptions that occur while executing instructions stored in the protected region of memory 360. Step 537 in FIG. 5B are the same as step 537 in FIG. 5A and step 338-342 in FIG. 5B are the same as steps 338-342 in FIG. 3.

Figure 6:
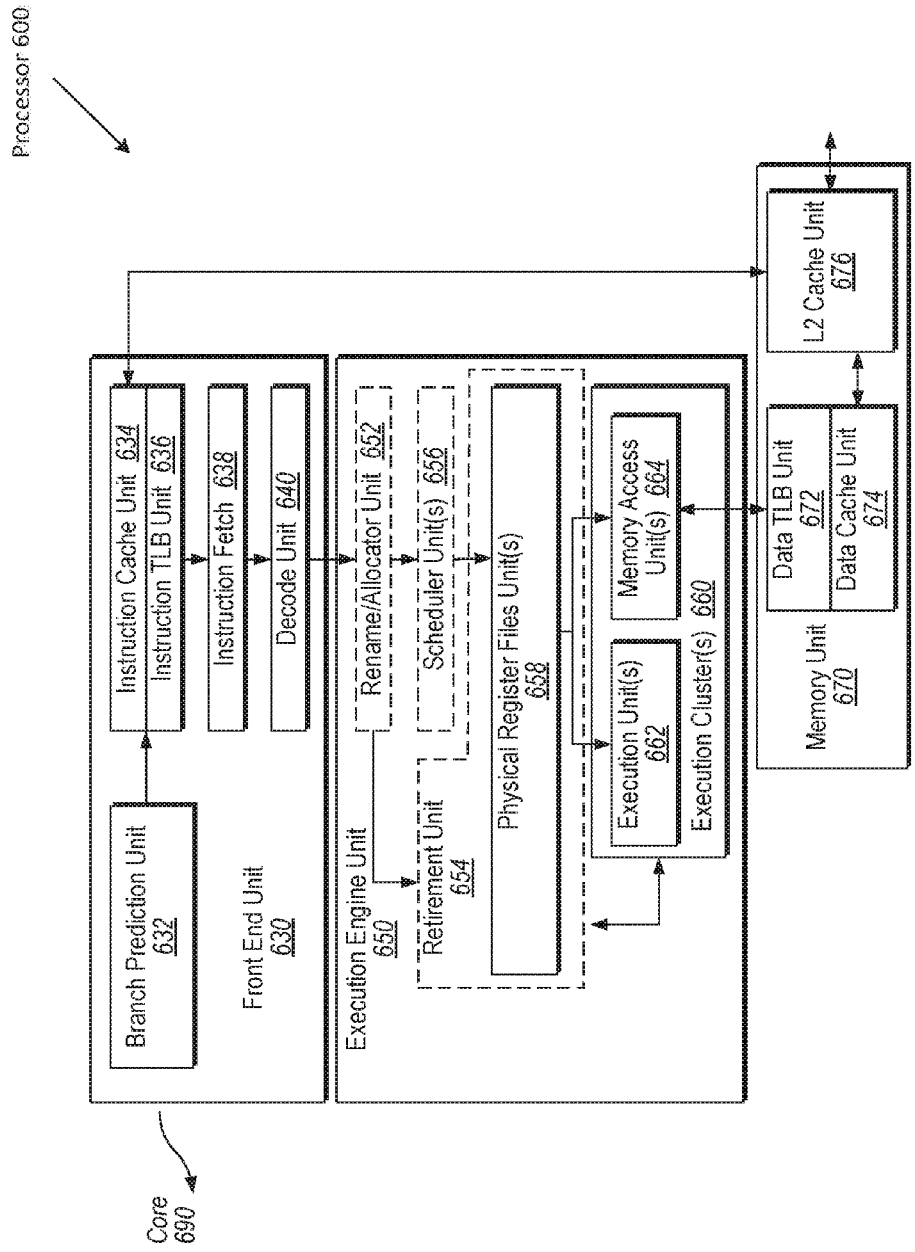
FIG. 6 is a block diagram illustrating a micro-architecture for a processor of FIG. 1, according to one embodiment.

FIG. 6 is a block diagram illustrating a micro-architecture for a processor 600 that implements the computing computer system 100 according to one embodiment. Specifically, processor 600 depicts an in-order architecture core and a register renaming logic, out-of-order issue/execution logic to be included in a processor according to at least one embodiment of the disclosure. The embodiments of the computing computer system 100 may be implemented in processor 600.

Processor 600 includes a front end unit 630 coupled to an execution engine unit 650, and both are coupled to a memory unit 670. The processor 600 may include a core 690 that is a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In another embodiment, the core 690 may have five stages.

The front end unit 630 includes a branch prediction unit 632 coupled to an instruction cache unit 634, which is coupled to an instruction translation lookaside buffer (TLB) unit 636, which is coupled to an instruction fetch unit 638, which is coupled to a decode unit 640. The decode unit 640 (also known as a decoder) may decode instructions, and generate as an output one or more micro-operations, microcode entry points, microinstructions, other instructions, or other control signals, which are decoded from, or which otherwise reflect, or are derived from, the original instructions. The decode unit 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in order.

The set of memory access units 664 is coupled to the memory unit 670, which may include a data prefetcher, a data TLB unit 672, a data cache unit (DCU) 674, and a level 2 (L2) cache unit 676, to name a few examples. In some embodiments, DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to the main memory.

In one embodiment, the data prefetcher speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may not support multithreading (e.g., executing two or more parallel sets of operations or threads, time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology)).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 7:
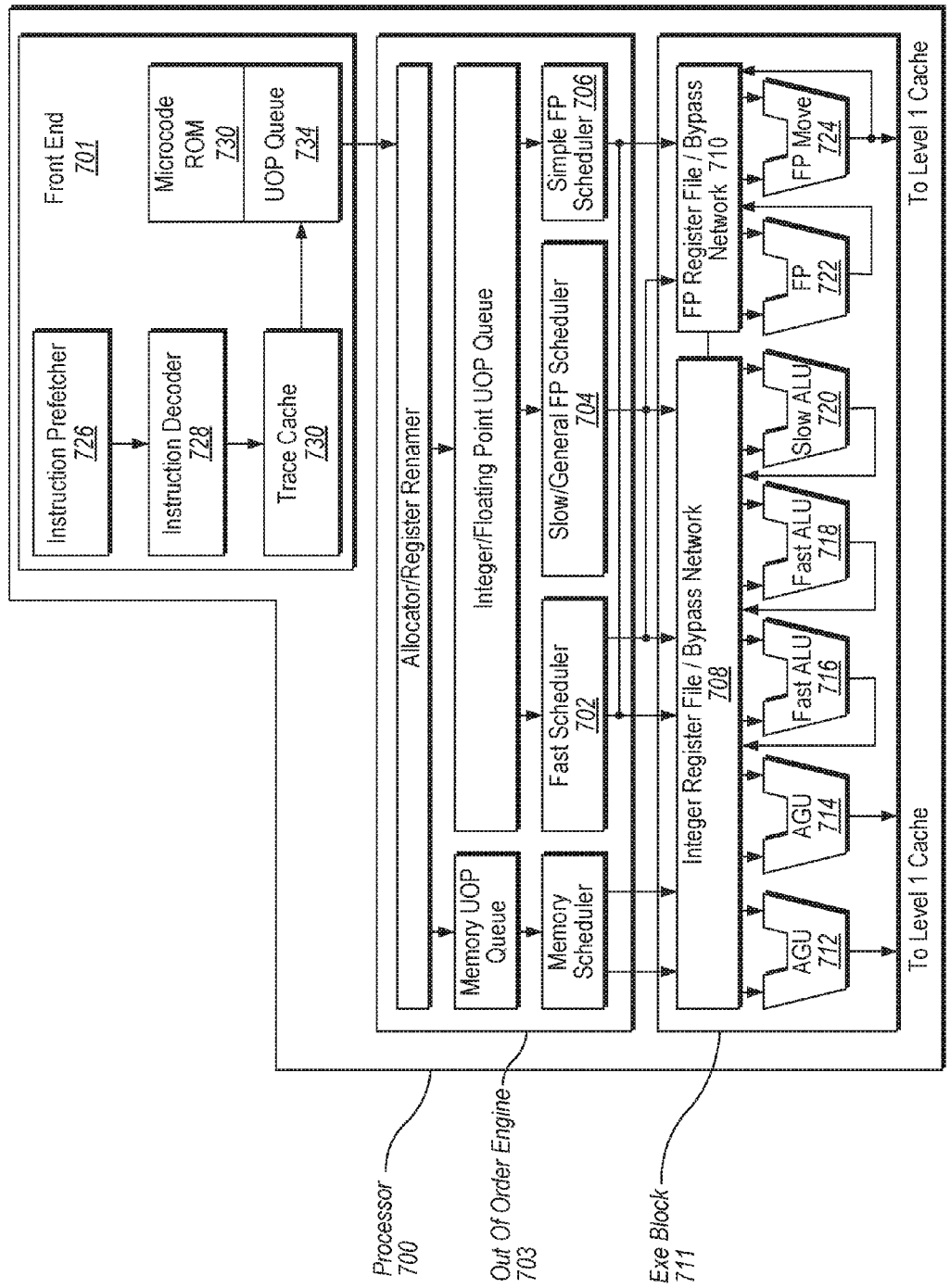
FIG. 7 illustrates a block diagram of the micro-architecture for a processor that includes logic circuits to perform access control, according to one embodiment.

FIG. 7 illustrates a block diagram of the micro-architecture for a processor 700 that includes logic circuits to perform access control according to one embodiment. In one embodiment, processor 700 is the processor 134 or 136 of FIG. 1.

In some embodiments, an instruction in accordance with one embodiment may be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the computing computer system 100 or 200 may be implemented in processor 700.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro-op or uops) that the machine may execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction may be decoded into a small number of micro-ops for processing at the instruction decoder 718. In another embodiment, an instruction may be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the micro-code, ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment may schedule on each half of the main clock cycle while the other schedulers may only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that may bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64-bit by 64-bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment may execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64-bit data operands. In alternative embodiments, the ALUs 716, 718, 720, may be implemented to support a variety of data bits including 16, 32, 128, 256, etc. Similarly, the floating point units 722, 724, may be implemented to support a range of operands having bits of various widths. For one embodiment, the floating point units 722, 724, may operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement access control according to one embodiment. In one embodiment, the execution block 711 of processor 700 may include PEL, to perform access control according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
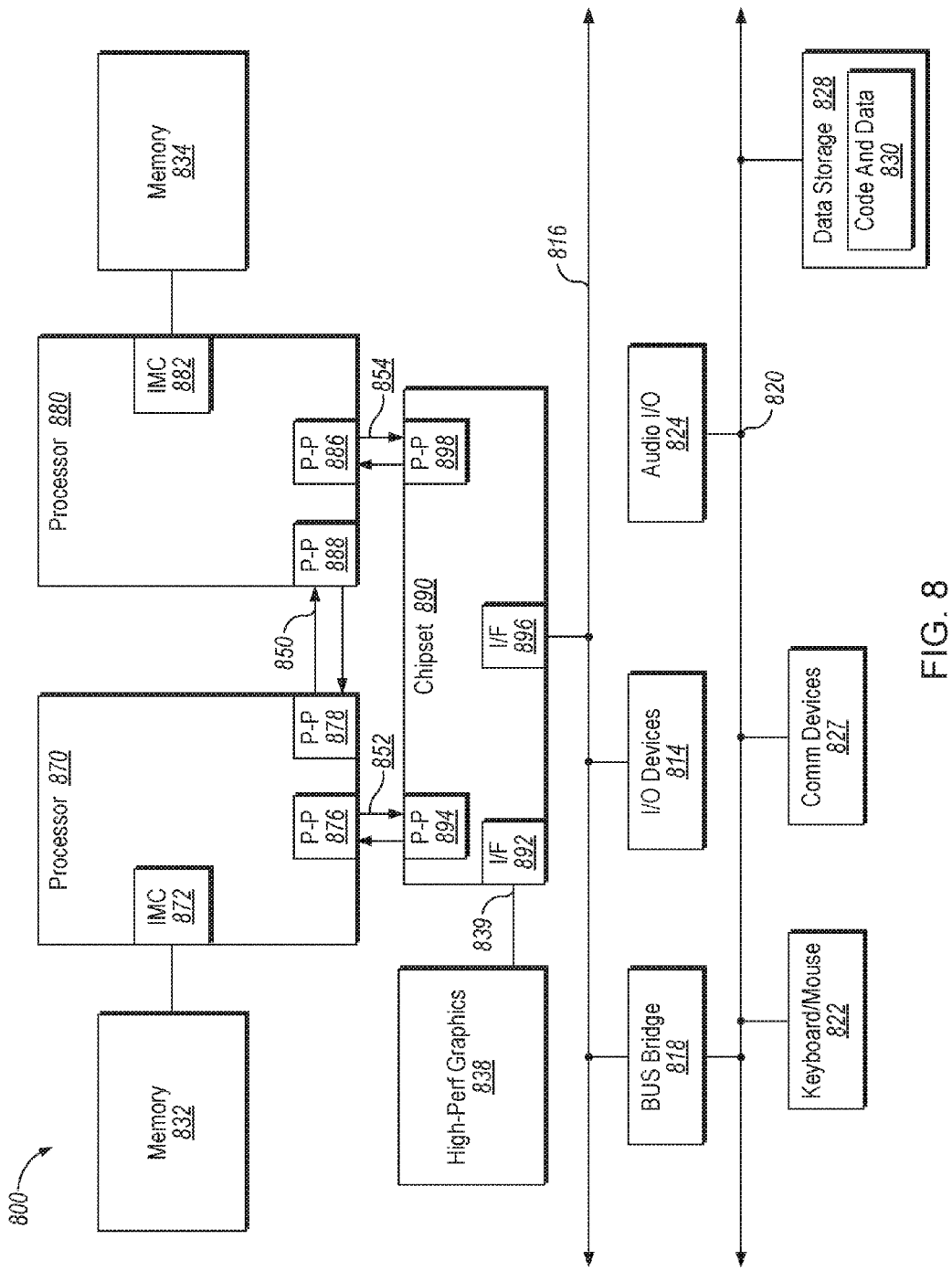
FIG. 8 is a block diagram of a computing system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the computing computer system 100 or 200 may be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
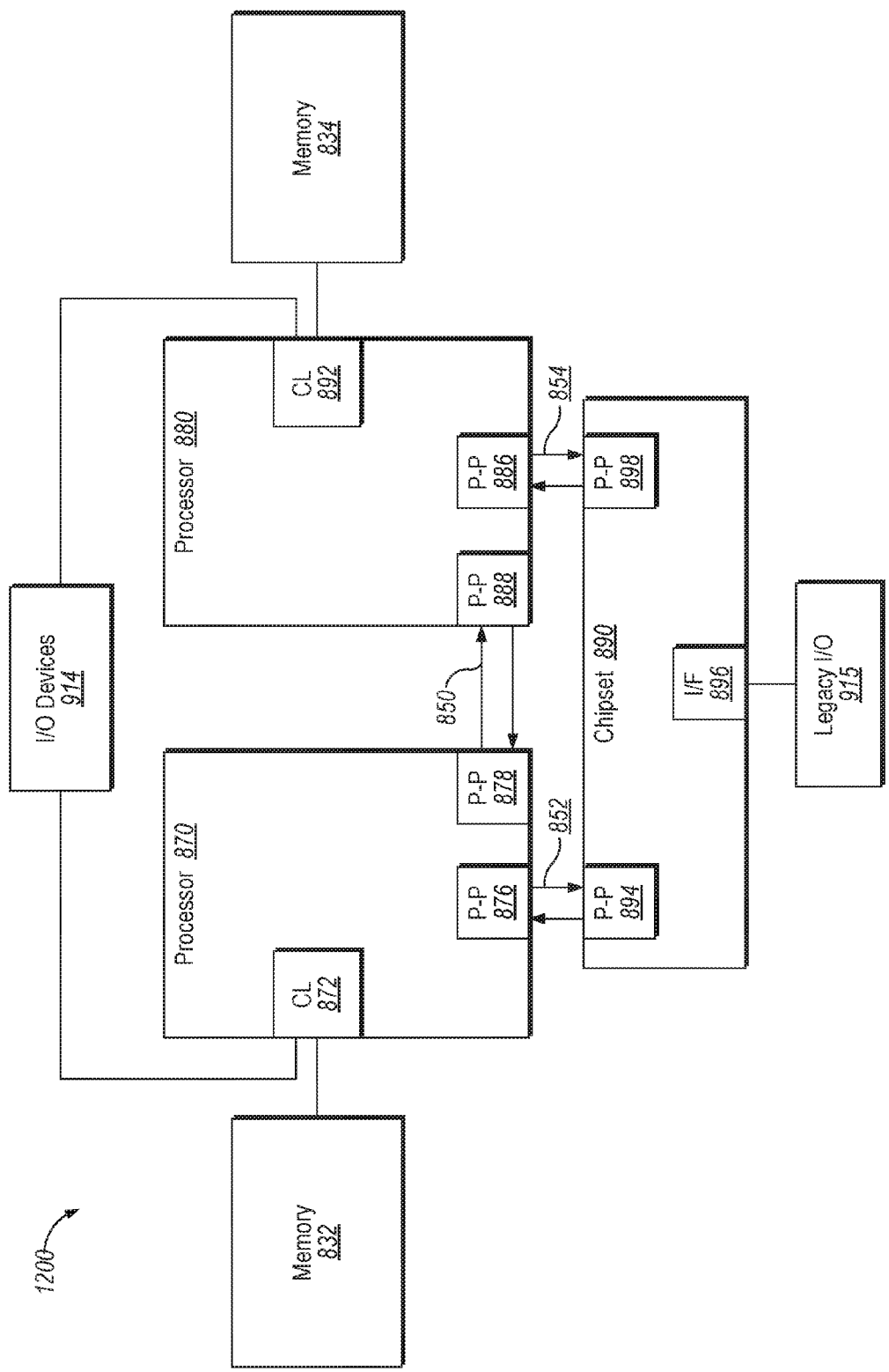
FIG. 9 is a block diagram of a computing system according to another implementation.

Referring now to FIG. 9, shown is a block diagram of a third system 900 in accordance with an embodiment of the present disclosure. Like elements in FIGS. 8 and 9 bear like reference numerals and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 872 and 882, respectively. For at least one embodiment, the CL 872, 882 may include integrated memory controller units such as described herein. In addition. CL 872, 882 may also include I/O control logic. FIG. 9 illustrates that the memories 832, 834 are coupled to the CL 872, 882, and that I/O devices 914 are also coupled to the control logic 872, 882. Legacy I/O devices 915 are coupled to the chipset 890. The embodiments of the computing computer system 100 or 200 may be implemented in processor 870, processor 880, or both.

Figure 10:
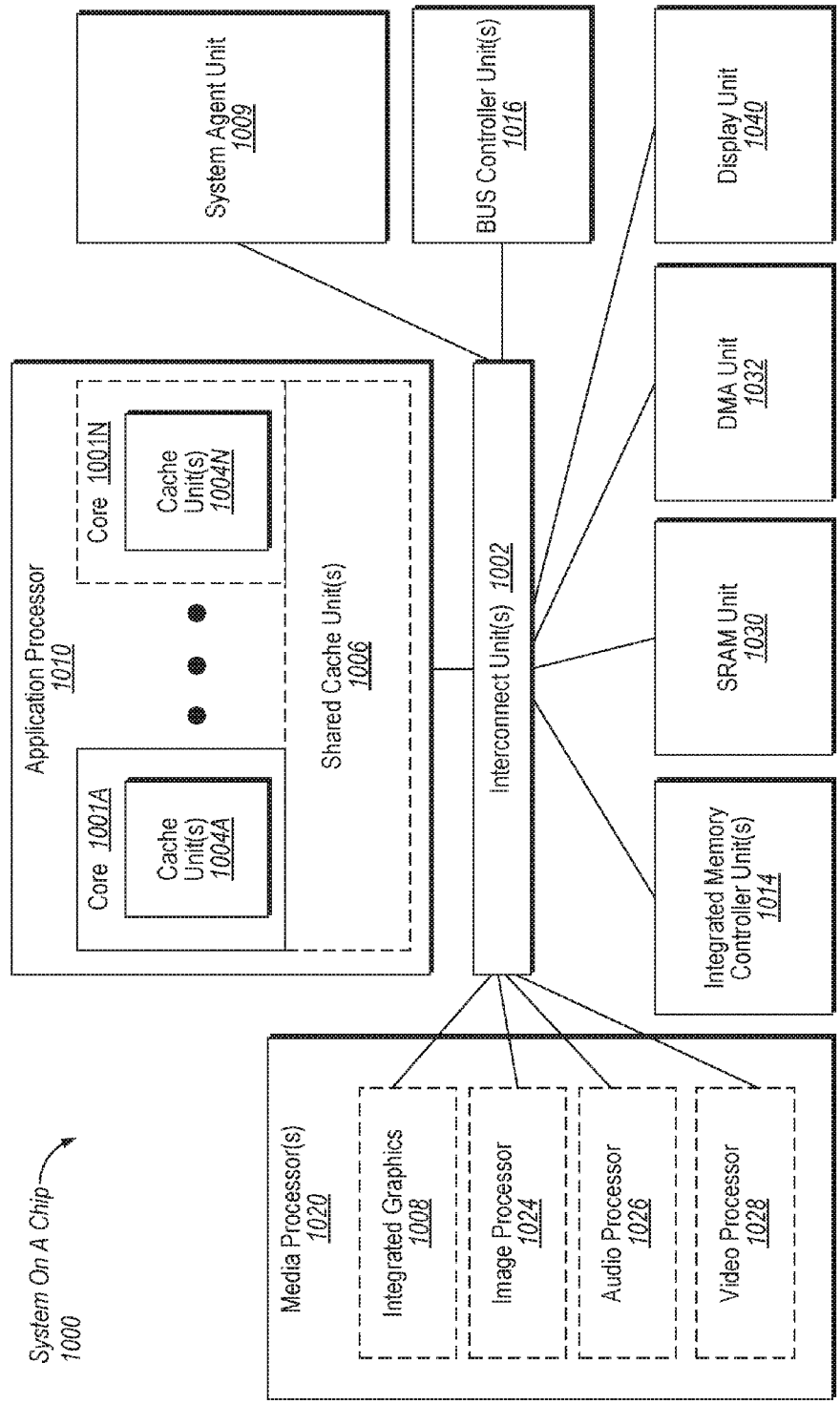
FIG. 10 is a block diagram of a system-on-a-chip according to one implementation.

FIG. 10 is an exemplary system on a chip (SoC) that may include one or more of the cores 1001. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, handheld devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1001A-N and shared cache unit(s) 1006; a system agent unit 1009; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying may be implemented in SoC 1000.

Figure 11:
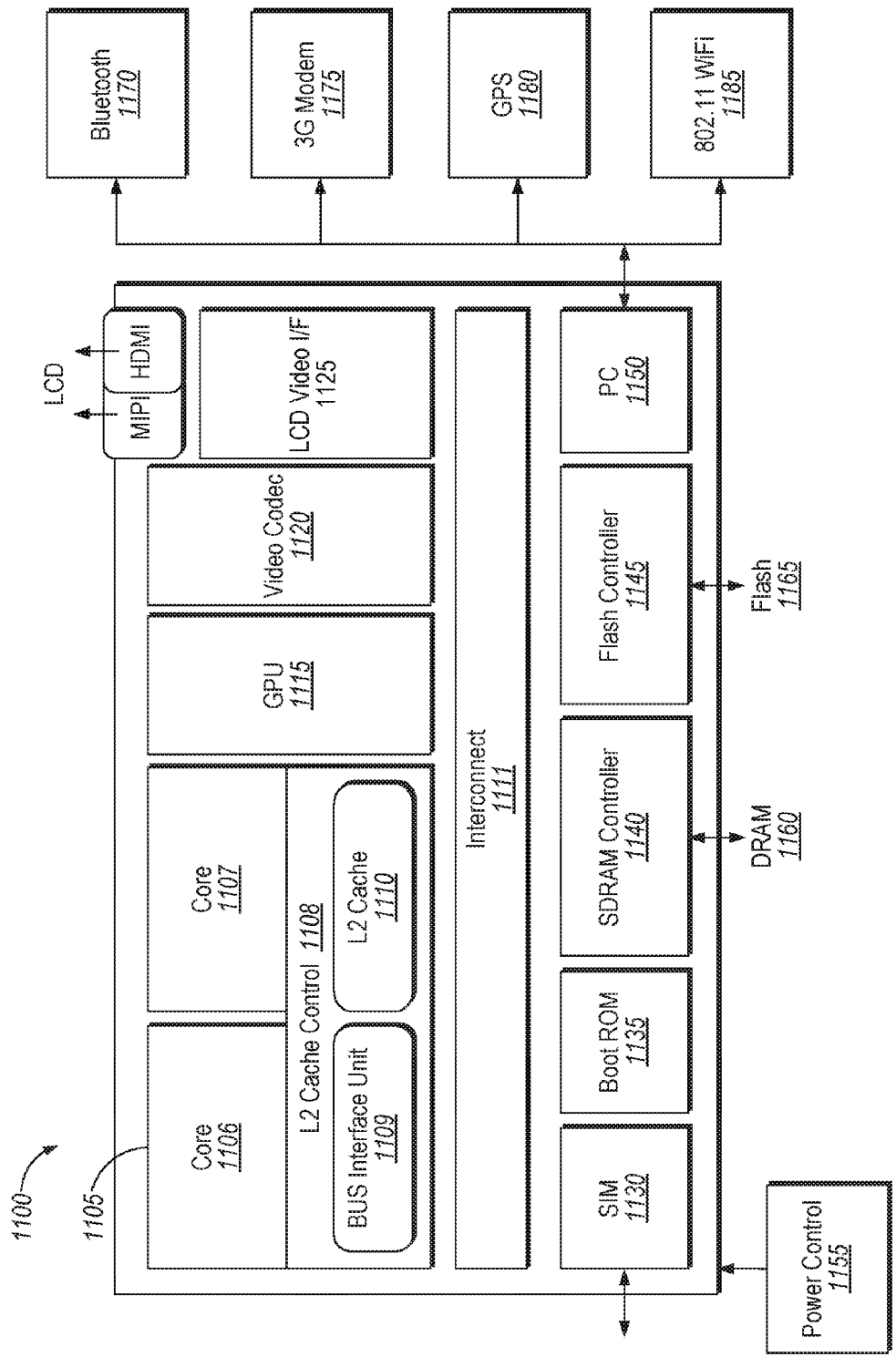
FIG. 11 illustrates another implementation of a block diagram of a computing system.

Turning next to FIG. 11, an embodiment of a system-on-a-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The embodiments of the computing computer system 100 or 200 may be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, an MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which may implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch-enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
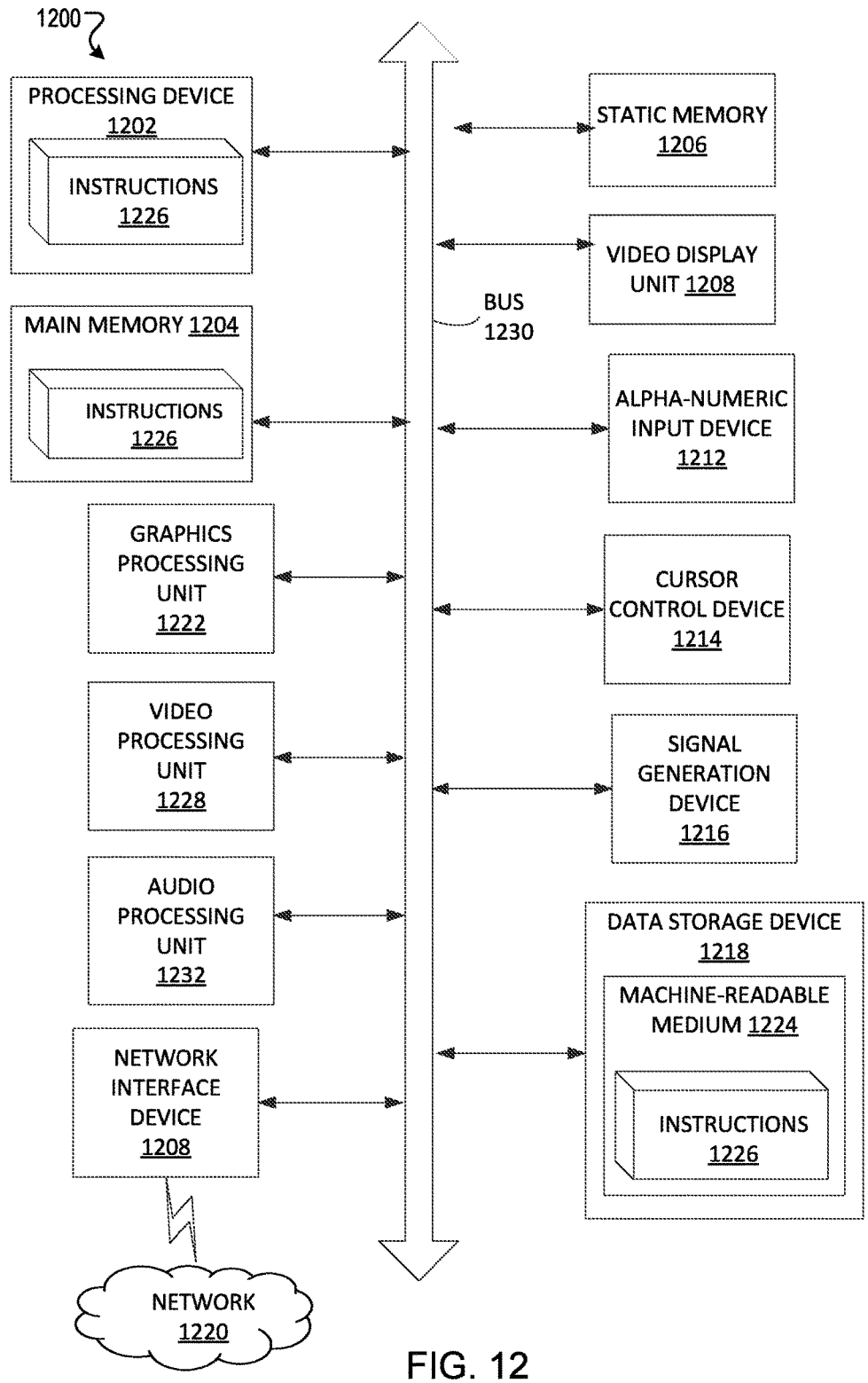
FIG. 12 illustrates another implementation of a block diagram of a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the computer system 100 may be implemented in computing system 1200.

The computing system 1200 includes a processing device 1202, main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field-programmable gate array (FPGA), a digital signal processor (DSP), network processor, or the like. In one embodiment, processing device 1202 may include one or processor cores. The processing device 1202 is configured to execute the instructions 1226 (e.g., processing logic) for performing the operations discussed herein. In one embodiment, processing device 1202 may include the processor 134 or 136 of FIG. 1. Alternatively, the computing system 1200 may include other components as described herein. It should be understood that the core may not support multithreading (e.g., executing two or more parallel sets of operations or threads, time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology)).

The computing system 1200 may further include a network interface device 1208 communicably coupled to a network 1220. The computing system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a signal generation device 1216 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1218 may include a computer-readable storage medium 1224 on which is stored instructions 1226 (e.g., software) embodying any one or more of the methodologies of functions described herein. The instructions 1226 (e.g., software) may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, such as the processor 134 or 136 described with respect to FIG. 1, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processor including: 1) a processor core; 2) a memory unit coupled between the processor core and a main memory, the main memory comprises an unprotected region and a protected region that includes a secured page, where the processor core is to: a) determine that a nested exception occurred while executing a first set of instructions for an application, wherein the nested exception is a second exception that occur during an execution of a handler for a first exception; b) in response to the nested exception occurring, invoke a first subroutine of the application, the first subroutine to forward exception context for the nested exception to a second subroutine of the application stored in the unprotected region; c) invoke, by the second subroutine, a third subroutine to execute a second set of instructions associated with the exception context for the one or more exceptions that occur within the first exception; d) invoke, by the second subroutine, the third subroutine to execute a third set of instructions associated with the exception context for the first exception; and e) resume executing the first set of instructions for the application.

In Example 2, the processor of Example 1, where the processor core is further to: 1) complete the execution of the first set of instructions; 2) exit the protected region; 3) execute a fourth set of instructions stored in the unprotected region of the main memory.

In Example 3, the processor of any one of Examples 1-2, where the first subroutine is an exception stub stored in the protected region, the second subroutine is a signal handler stored in the unprotected region, and the third subroutine is an exception handler stored in the protected region.

In Example 4, the processor of any one of Examples 1-3, where the nested exception comprises the first exception and a second exception, and wherein the second exception occurs while the third subroutine is handling the first exception.

In Example 5, the processor of any one of Examples 1-4, where the nested exception comprises two or more of a page fault exception, a divide by zero exception, or a general protection (GP) fault.

In Example 6, the processor of any one of Examples 1-5, where the secured exception page is a state save area (SSA) for storing processor context for the application.

In Example 7, the processor of any one of Examples 1-6, where the protected region is an enclave instantiated by the application to provide a secure container to execute the first set of instructions.

In Example 8, the processor of any one of Examples 1-7, where the processor core is further to resume executing the first set of instructions at an asynchronous exit point (AEP) where the first exception occurred in the first set of instructions.

In Example 9, the processor of any one of Examples 1-8, where the exception context comprises information indicating a type of nested exception that occurred and a location in the first set of instructions that the exception occurred.

Various embodiments can have different combinations of the structural features described above. For instance, all optional features of the computing system described above can also be implemented with respect to the method or process described herein and specifics in the examples can be used anywhere in one or more embodiments.

Example 10 is a system including: 1) a processor including multiple execution units to execute instructions; and 2) a memory device coupled to the processor, where the memory device stores the instructions in an unprotected region and a protected region, where the processor is to: a) determine that a first exception occurred while executing a first set of instructions for an application stored in a secured page of the protected region; b) invoke a first subroutine to forward exception context for the first exception to a second subroutine, wherein the first subroutine is stored in the protected region and the second subroutine is stored in the unprotected region; and c) invoke, by the second subroutine, a third subroutine to execute a second set of instructions associated with the exception context for the first exception.

In Example 11, the system of Example 10, where the processor is further to: 1) resume executing the first set of instructions; 2) exit the protected region; and 3) execute a third set of instructions stored in the unprotected region in the memory device.

In Example 12, the system of any one of Examples 10-11, where the processor is further to: 1) determine that a second exception occurred when the second subroutine is executing the instructions associated with exception context for the first exception; 2) pause executing the instructions associated with exception context for the first exception; 3) invoke a fourth exception subroutine, stored in the secured exception page, to forward exception context for the second exception to the second subroutine; 4) execute a third set of instructions associated with exception context for the second exception; and 5) resume executing instructions associated with exception context for the first exception.

In Example 13, the system of any one of Examples 10-12, where the second exception is an exception nested in the first exception.

In Example 14, the system of any one of Examples 10-13, where the first exception is a page fault exception, a run-time exception, a compile time exception, an input/output (I/O) exception, a structured query language (SQL) exception, a data access exception, a class not found exception, or a instantiation exception.

In Example 15, the system of any one of Examples 10-14, where the secured exception page is a state save area (SSA) for storing a processor context.

Various embodiments can have different combinations of the structural features described above. For instance, all optional features of the computing system described above can also be implemented with respect to the method or process described herein and specifics in the examples can be used anywhere in one or more embodiments.

Example 16 is a method including: 1) initiating execution of a first set of instructions, for an application, stored in a secured page of a memory; 2) determining that a first exception occurred while executing the first set of instructions; 3) in response to the first exception occurring, invoking an exception subroutine, of the application, stored in a secured exception page, the exception subroutine to forward exception context for the first exception to an exception handler stored in the secured page; 4) initiating execution, by the exception handler, of a second set of instructions associated with the exception context for the first exception; 5) determining that a second exception occurred while executing second set of instructions; 6) in response to the second exception occurring, invoking a second exception subroutine of the application stored in the secured exception page, the second exception subroutine to forward exception context for the second exception to the exception handler; 7) executing, by the exception handler, a third set of instructions associated with exception context for the second exception; 8) completing the execution of the first set of instructions associated with exception context for the first exception; and 9) resuming executing the first set of instructions for the application.

In Example 17, the method of Example 16, further including, in response to the second exception occurring, pausing executing the instructions associated with exception context for the first exception.

In Example 18, the method of any one of Examples 16-17, where the exception subroutine is a signal handler is stored in an unprotected region of memory in the memory.

In Example 19, the method of any one of Examples 16-18, where the exception context comprises information indicating a type of exception that occurred and a location in the first set of instructions that the exception occurred.

In Example 20, the method of any one of Examples 16-19, where the exception context comprises information indicating a type of exception that occurred and a location in the first set of instructions that the exception occurred.

Various embodiments may have different combinations of the structural features described above. For instance, all optional features of the computing system described above may also be implemented with respect to the method or process described herein and specifics in the examples may be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computing system have not been described in detail in order to avoid unnecessarily obscuring the present disclosure.

The embodiments are described with reference to access control in specific integrated circuits, such as in computing platforms or microprocessors. The embodiments may also be applicable to other types of integrated circuits and programmable logic devices. For example, the disclosed embodiments are not limited to desktop computing systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. It is described that the system may be any kind of computer or embedded system. The disclosed embodiments may especially be used for low-end devices, like wearable devices (e.g., watches), electronic implants, sensory and control infrastructure devices, controllers, supervisory control, and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and may be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, a reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, wherein the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computing systems have been used. For example, the decimal number ten may also be represented as a binary value of 1010 and a hexadecimal letter A. Therefore, a value includes any representation of information capable of being held in a computing system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information therefrom.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
    a processor core;
    a memory unit coupled between the processor core and a main memory, the main memory comprises an unprotected region and a protected region that includes a secured page; and
    a page miss handler (PMH) coupled to the memory unit, the PMH to maintain access control information for the protected region, wherein the processor core is to:
        determine that a nested exception occurred while executing a first set of instructions for an application, wherein the nested exception is a second exception that occur during an execution of a handler for a first exception;
        in response to the nested exception occurring, invoke a first subroutine of the application, the first subroutine to forward exception context for the nested exception to a second subroutine of the application stored in the unprotected region;
        invoke, by the second subroutine, a third subroutine to execute a second set of instructions associated with the exception context for the one or more exceptions that occur within the first exception;
        invoke, by the second subroutine, the third subroutine to execute a third set of instructions associated with the exception context for the first exception; and
        resume executing the first set of instructions for the application.

2. The processor of claim 1, wherein the processor core is further to:
    complete the execution of the first set of instructions;
    exit the protected region; and
    execute a fourth set of instructions stored in the unprotected region of the main memory.

3. The processor of claim 1, wherein the first subroutine is an exception stub stored in the protected region, the second subroutine is a signal handler stored in the unprotected region, and the third subroutine is an exception handler stored in the protected region.

4. The processor of claim 3, wherein the nested exception comprises the first exception and a second exception, and wherein the second exception occurs while the third subroutine is handling the first exception.

5. The processor of claim 1, wherein the nested exception comprises two or more of a page fault exception, a divide by zero exception, or a general protection (GP) fault.

6. The processor of claim 1, wherein the secured page is a state save area (SSA) for storing processor context for the application.

7. The processor of claim 1, further comprising a memory controller coupled to the memory unit and a system agent coupled between the memory controller and the processor core, the system agent comprising a memory encryption engine (MEE) to encrypt, decrypt, or authenticate data stored in the protected region, wherein the protected region is an enclave instantiated by the application to provide a secure container to execute the first set of instructions.

8. The processor of claim 1, wherein the processor core is further to resume executing the first set of instructions at an asynchronous exit point (AEP) where the first exception occurred in the first set of instructions.

9. The processor of claim 1, wherein the exception context comprises information indicating a type of nested exception that occurred and a location in the first set of instructions that the exception occurred.

10. A system comprising:
    a processor comprising a plurality of execution units to execute instructions;
    a memory device coupled to the processor, wherein the memory device stores the instructions in an unprotected region and a protected region; and
    a page miss handler (PMH) coupled to the memory device, the PMH to maintain access control information for the protected region, wherein the processor is to:
        determine that a first exception occurred while executing a first set of instructions for an application stored in a secured page of the protected region;
        invoke a first subroutine to forward exception context for the first exception to a second subroutine, wherein the first subroutine is stored in the protected region and the second subroutine is stored in the unprotected region; and
        invoke, by the second subroutine, a third subroutine to execute a second set of instructions associated with the exception context for the first exception.

11. The system of claim 10, wherein the processor is further to:
    resume executing the first set of instructions;
    exit the protected region; and
    execute a third set of instructions stored in the unprotected region in the memory device.

12. The system of claim 10, wherein the processor is further to:
    determine that a second exception occurred when the second subroutine is executing the instructions associated with exception context for the first exception;
    pause executing the instructions associated with exception context for the first exception;
    invoke a fourth exception subroutine, stored in the secured page, to forward exception context for the second exception to the second subroutine;
    execute a third set of instructions associated with exception context for the second exception; and
    resume executing instructions associated with exception context for the first exception.

13. The system of claim 12, wherein the second exception is an exception nested in the first exception.

14. The system of claim 10, wherein the first exception is a page fault exception, a run-time exception, a compile time exception, an input/output (I/O) exception, a structured query language (SQL) exception, a data access exception, a class not found exception, or a instantiation exception.

15. The system of claim 10, wherein the secured page is a state save area (SSA) for storing a processor context.

16. A method comprising:
   initiating execution of a first set of instructions, for an application, stored in a secured page of a memory;
   determining that a first exception occurred while executing the first set of instructions;
   in response to the first exception occurring, invoking an exception subroutine, of the application, stored in a secured exception page, the exception subroutine to forward exception context for the first exception to an exception handler stored in the secured page;
   initiating execution, by the exception handler, of a second set of instructions associated with the exception context for the first exception;
   determining that a second exception occurred while executing second set of instructions;
   in response to the second exception occurring, invoking a second exception subroutine of the application stored in the secured exception page, the second exception subroutine to forward exception context for the second exception to the exception handler;
   executing, by the exception handler, a third set of instructions associated with exception context for the second exception;
   completing the execution of the first set of instructions associated with exception context for the first exception; and
   resuming executing the first set of instructions for the application.

17. The method of claim 16, further comprising, in response to the second exception occurring, pausing executing the instructions associated with exception context for the first exception.

18. The method of claim 16, wherein the exception subroutine is a signal handler is stored in an unprotected region of memory in the memory.

19. The method of claim 16, wherein the exception context comprises information indicating a type of exception that occurred and a location in the first set of instructions that the exception occurred.

20. The method of claim 16, further comprising in response to invoking the exception subroutine, executing an enclave-pop-state save area (EPOPSSA) instruction to send the exception context to the secured page, wherein the EPOPSSA instruction is a combination of an EEXIT instruction to exit the exception handler and an ERESUME instruction to directly enter the secured page.

* * * * *